J. H. ROEBUCK.
ATTACHMENT FOR HORSESHOES.
APPLICATION FILED MAY 10, 1913.

1,089,870.

Patented Mar. 10, 1914.

Witnesses:
Henry S. Bull
A. A. Oliver

Inventor:
John H. Roebuck
By Joshua R. H. Potts
His Attorney.

UNITED STATES PATENT OFFICE.

JOHN H. ROEBUCK, OF CHICAGO, ILLINOIS.

ATTACHMENT FOR HORSESHOES.

1,089,870.  Specification of Letters Patent.  Patented Mar. 10, 1914.

Application filed May 10, 1913. Serial No. 766,695.

*To all whom it may concern:*

Be it known that I, JOHN H. ROEBUCK, a citizen of the United States, and a resident of the city of Chicago, county of Cook, and State of Illinois, have invented certain new and useful Improvements in Attachments for Horseshoes, of which the following is a specification.

My invention relates to improvements in non-slipping attachments for horse shoes and has for its object the provision of an attachment adapted for ready and expeditious arrangement upon a shoe or detachment therefrom, and further an attachment which will be of durable and economical construction and efficient in operation.

Other objects will appear hereinafter.

The invention consists in the combinations and arrangements of parts hereinafter described and claimed.

The invention will be best understood by reference to the accompanying drawing forming a part of this specification, and in which—

Figure 1:
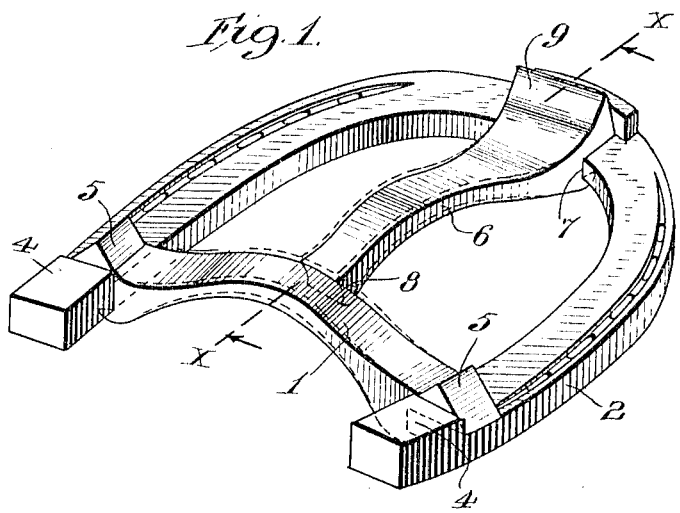
Figure 2:
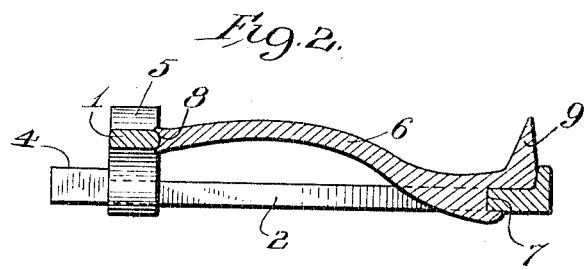
Figure 3:
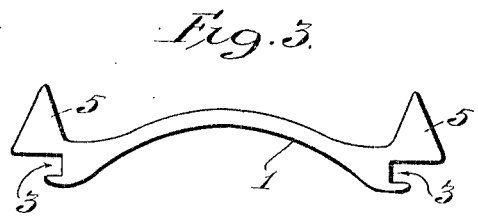

Figure 1 is a perspective view of a horse shoe to which is applied an attachment embodying my invention, Fig. 2 is a section taken on line x—x of Fig. 1, and Fig. 3 is a side elevation of the cross bar of my attachment, detached.

The preferred form of construction as illustrated in the drawing comprises a cross bar 1 which is adapted to be arranged between the ends of the horse shoe. The extremities of said bar are provided with recesses 3 for embracing the inner edge portions of said horse shoe ends. When arranged upon the horse shoe, the respective extremities of the bar 1 are adapted to engage against the rearward sides of the permanent calks 4 of the shoe which serve to limit outward movement or sliding of the cross bar 1 relative to the shoe. Provided at the extremities of the bar 1 are outwardly projecting tapering calks 5 adapted, when the shoe is in use, to securely engage the pavement to serve, together with a third calk, hereinafter mentioned, to prevent slipping.

The bar 1 is of bowed or buckled construction as clearly shown in the several views and so that, after arrangement thereof upon the horse shoe, the same may be securely clamped in position upon the shoe by tapping or pounding upon the convex portion or buckle of the bar. By so doing the bar 1 will tend to straighten, and in straightening the same will be increased in length, whereby, the respective extremities thereof will be forced into secure gripping relation with the adjacent or inner sides of the horse shoe ends.

Coöperating with the bar 1 is a second bar 6 provided at its forward end with a recess 7 adapted to embrace the forward or bight portion of the shoe, the opposite extremity of said bar being provided with a recess 8 for embracing the adjacent edge of the bar 1. Provided at the forward extremity of the bar 6 is a tapering calk 9 which coöperates with the calks 5 in the prevention of slipping when the shoe is in use.

The bar 6 is of a length to fit snugly between the bight portion of the shoe and the bar 1, and said bar is also of bowed or buckled construction as shown so that by tapping or pounding the outer convex side or buckle thereof in order to straighten said bar, the extremities thereof may be forced into gripping relation with the engaged portion of the shoe and the adjacent side of the bar 1. The positions of the bars 1 and 6, before pounding thereof, to effect locking of said bars in position, are shown in dotted lines in Fig. 1, said bars being shown in full lines in the position assumed thereby after manipulation.

With the construction set forth it will be seen that the bars 1 and 6 will coöperate to secure each other in operative position upon the shoe, the bar 6 serving to prevent forward sliding of the bar 1 relative to the shoe and said bar 1 serving as an engagement for the bar 6 for maintaining the latter in position. The bars 1 and 6 may be readily and quickly arranged in position upon a shoe and readily and expeditiously removed when desired. The buckling or bowing of the members 1 and 2, in addition to serving as a means whereby said members may be clamped in operative position, also render the same of an adjustable nature so that the same will be applicable for use upon horse shoes of various sizes.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

The combination with a horse shoe, of a cross bar arranged and extending between the ends of the shoe, the ends of said bar being adapted to abut the rearward sides of the permanent calks of the shoe; calks on said bar, said bar being bowed whereby, when said bar is straightened, the ends thereof will move into gripping relation with the adjacent end portion of the shoe; a second bar arranged at substantially right angles to said first mentioned bar and medially thereof; and a calk on said bar, one end of said second mentioned bar engaging against said first mentioned bar, the opposite end of said second mentioned bar engaging said shoe, said second mentioned bar being also bowed whereby, when the same is straightened, the ends thereof will be moved into gripping relation with said first mentioned bar and said shoe, the respective ends of said last mentioned bar being channel formed for loosely embracing said first mentioned bar and said shoe, substantially as described.

In testimony whereof I have signed my name to this specification in the presence of two subscribing witnesses.

JOHN H. ROEBUCK.

Witnesses:
JOSHUA R. H. POTTS,
HELEN F. LILLIS.

Copies of this patent may be obtained for five cents each, by addressing the "Commissioner of Patents, Washington, D. C."